US012013143B2

(12) United States Patent
Zhang et al.

(10) Patent No.: US 12,013,143 B2
(45) Date of Patent: Jun. 18, 2024

(54) WATER RETAINING STRUCTURE AND HUMIDIFIER WITH WATER RETAINING STRUCTURE

(71) Applicant: GREE ELECTRIC APPLIANCES, INC. OF ZHUHAI, Zhuhai (CN)

(72) Inventors: Jianhua Zhang, Zhuhai (CN); Yuliang Xu, Zhuhai (CN); Shuntian Huo, Zhuhai (CN); Wei Wang, Zhuhai (CN); Zhenhua Lin, Zhuhai (CN); Jianfei Hou, Zhuhai (CN); Zhicong Chen, Zhuhai (CN); Luqing Hou, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 192 days.

(21) Appl. No.: 17/277,121

(22) PCT Filed: Aug. 5, 2019

(86) PCT No.: PCT/CN2019/099173
§ 371 (c)(1),
(2) Date: Mar. 17, 2021

(87) PCT Pub. No.: WO2020/073725
PCT Pub. Date: Apr. 16, 2020

(65) Prior Publication Data

US 2021/0389020 A1 Dec. 16, 2021

(30) Foreign Application Priority Data

Oct. 11, 2018 (CN) ......................... 201811182161.1

(51) Int. Cl.
*F24F 13/22* (2006.01)
*F24F 6/12* (2006.01)
(Continued)

(52) U.S. Cl.
CPC .............. *F24F 13/222* (2013.01); *F24F 6/12* (2013.01); *B05B 17/0615* (2013.01); *F24F 2006/008* (2013.01); *Y10S 261/48* (2013.01)

(58) Field of Classification Search
CPC ...... F24F 13/222; F24F 6/12; F24F 2006/008; F24F 13/00; B05B 17/0615; Y10S 261/48
See application file for complete search history.

(56) References Cited

U.S. PATENT DOCUMENTS 3,469,785 A * 9/1969 Tobin .................. B05B 17/0615 239/4
3,901,443 A * 8/1975 Mitsui ................. B05B 17/0615 239/338
(Continued)

FOREIGN PATENT DOCUMENTS

CN 104990184 A 10/2015
CN 105352090 A 2/2016
(Continued)

OTHER PUBLICATIONS

EPO translation of CN207855995 (Year: 2017).*
(Continued)

*Primary Examiner* — Stephen Hobson
(74) *Attorney, Agent, or Firm* — Armstrong Teasdale LLP

(57) ABSTRACT

Some embodiments of the present disclosure provide a water retaining structure and a humidifier with the water retaining structure. The water retaining structure is disposed on a bottom surface of a water tank assembly. The water retaining structure and the water tank assembly are split. The water retaining structure includes a mist collecting portion and a water retaining portion. The mist collecting portion is formed into a mist collecting space. The mist collecting space communicates with a mist outlet tube in the water tank assembly. The water retaining portion is configured to collect water flowing down from the mist outlet tube. The
(Continued)

water retaining structure and the water tank assembly are split so that the bottom surface of the water tank assembly is configured as a flat surface, or a height of a structure disposed on the bottom surface is reduced.

16 Claims, 3 Drawing Sheets

(51) Int. Cl.

| | |
|---|---|
| *B05B 17/06* | (2006.01) |
| *F24F 6/00* | (2006.01) |

(56) References Cited

U.S. PATENT DOCUMENTS

| | | | | | |
|---|---|---|---|---|---|
| 3,989,042 | A * | 11/1976 | Mitsui | A61M 11/005 | 310/317 |
| 4,031,171 | A * | 6/1977 | Asao | B05B 17/0615 | 261/119.1 |
| 4,746,466 | A * | 5/1988 | Takahashi | B05B 17/0615 | 261/81 |
| 5,121,541 | A * | 6/1992 | Patrakis | B26B 19/40 | 30/41 |
| 5,464,572 | A * | 11/1995 | Bonzi | B05B 17/0669 | 361/231 |
| 5,645,769 | A * | 7/1997 | Tamaru | B01F 31/80 | 261/DIG. 4 |
| 5,832,176 | A * | 11/1998 | Jung | A61L 2/04 | 261/142 |
| 6,244,576 | B1 * | 6/2001 | Tsai | F24F 6/02 | 261/DIG. 65 |
| 7,686,285 | B2 * | 3/2010 | Murray | B05B 17/0615 | 261/81 |
| 7,775,459 | B2 * | 8/2010 | Martens, III | B05B 17/0684 | 128/200.14 |
| 9,776,144 | B1 * | 10/2017 | Lu | F24F 11/0008 | |
| 10,012,402 | B2 * | 7/2018 | Cai | F24F 11/0008 | |
| 10,639,666 | B2 * | 5/2020 | Kim | B05B 1/02 | |
| 11,365,895 | B2 * | 6/2022 | Seo | F24F 6/14 | |
| 2004/0020487 | A1 * | 2/2004 | Koch | A61M 16/164 | 261/130 |
| 2007/0216259 | A1 * | 9/2007 | Kang | F24F 6/12 | 310/353 |
| 2008/0223953 | A1 * | 9/2008 | Tomono | A61M 11/005 | 128/200.16 |
| 2013/0175362 | A1 * | 7/2013 | Lee | F24F 6/14 | 239/302 |
| 2017/0082306 | A1 * | 3/2017 | Murakami | F24F 6/00 | |
| 2020/0096213 | A1 * | 3/2020 | Liang | F24F 6/12 | |
| 2020/0284451 | A1 * | 9/2020 | Yang | F24F 6/02 | |
| 2020/0340694 | A1 * | 10/2020 | Yang | F24F 6/12 | |
| 2020/0370769 | A1 * | 11/2020 | Yang | F24F 6/12 | |
| 2020/0393149 | A1 * | 12/2020 | Yang | F24F 6/14 | |

FOREIGN PATENT DOCUMENTS

| | | | | | |
|---|---|---|---|---|---|
| CN | 205227653 | | * | 5/2016 | |
| CN | 205227653 | U | | 5/2016 | |
| CN | 205227653 | U | * | 5/2016 | |
| CN | 105972740 | A | | 9/2016 | |
| CN | 205690586 | U | | 11/2016 | |
| CN | 206387053 | U | | 8/2017 | |
| CN | 206387053 | U | * | 8/2017 | |
| CN | 207855995 | | * | 9/2017 | |
| CN | 206669953 | U | | 11/2017 | |
| CN | 206669953 | U | * | 11/2017 | |
| CN | 108119976 | A | | 6/2018 | |
| CN | 108119976 | A | * | 6/2018 | F24F 13/20 |
| CN | 207855995 | U | * | 9/2018 | |
| CN | 109237689 | A | | 1/2019 | |
| CN | 208936392 | U | | 6/2019 | |
| CN | 110145831 | A | * | 8/2019 | F24F 13/24 |
| DE | 3706593 | A1 | | 9/1987 | |
| JP | 56100247 | A | | 8/1981 | |
| JP | 10122611 | A | * | 5/1998 | |
| JP | 3060967 | B2 | * | 7/2000 | |
| JP | 2002098369 | A | * | 4/2002 | |
| JP | 2016080336 | | * | 5/2016 | |
| JP | 2016080336 | A | * | 5/2016 | |
| WO | 2012091369 | A2 | | 7/2012 | |

OTHER PUBLICATIONS

EPO translation of JP2016080336 (Year: 2016).*

EPO translation of CN205227653 (Year: 2016).*

International Search Report for corresponding PCT/CN2019/099173, mailed Nov. 1, 2019, 3 pages.

* cited by examiner

WATER RETAINING STRUCTURE AND HUMIDIFIER WITH WATER RETAINING STRUCTURE

CROSS REFERENCE TO RELATED APPLICATIONS

The present disclosure is a national stage application of International Patent Application No. PCT/CN2019/099173, filed on Aug. 5, 2019, and claims priority to Chinese Patent Application No. 201811182161.1, filed on Oct. 11, 2018 and entitled "Water Retaining Structure and Humidifier with Water Retaining Structure", the disclosure of which are hereby incorporated by reference in their entirety.

TECHNICAL FIELD

The present disclosure relates to a technical field of humidifiers, and in particular, to a water retaining structure and a humidifier with the water retaining structure.

BACKGROUND

A humidifier is usually provided with a mist collecting rib at a bottom of a water tank corresponding to an atomizer, the mist collecting rib encloses an atomizing cavity, and water mist formed by the atomizer enters a mist outlet tube through the atomizing cavity, so that the water mist can be prevented from diffusing to an area outside the mist outlet tube. In addition, in order to prevent coagulated water drops in the mist outlet tube from directly dropping in the water tank to emit a water drop sound, a water retaining rib is further disposed in the atomizing cavity, and the water retaining rib is installed at an inlet of the mist outlet tube.

In a humidifier known to inventors, the mist collecting rib is usually integrally formed with a bottom cover of the water tank, and the water retaining rib is adhered to a sleeve of an air duct in the mist collecting rib, so that this method has defects that the mist collecting rib is usually 40-50 mm high, and is not well manufactured by a mold, a welding difficulty between the bottom cover of the water tank and the water tank is improved due to the arrangement of the mist collecting rib, and a welding quality cannot be guaranteed. On the other hand, an internal space of the atomizing cavity enclosed by the mist collecting ribs is small, so that an operation of installing the water retaining rib in the atomizing cavity is difficult, and an adhesive water disassembling efficiency of the water retaining rib is low.

SUMMARY

In view of this, it is an object of the present disclosure to provide a water retaining structure split from a water tank assembly and a humidifier including the same.

In a first aspect, some embodiments provide a water retaining structure, which is disposed on a bottom surface of a water tank assembly. The water retaining structure and the water tank assembly are split, the water retaining structure includes a mist collecting portion and a water retaining portion, the mist collecting portion is formed into a mist collecting space, the mist collecting space is communicated with a mist outlet tube in the water tank assembly, and the water retaining portion is configured to collect water flowing down from the mist outlet tube.

In some embodiments, the water retaining structure further includes a flow guiding portion, wherein, the flow is used for guiding portion deflecting water mist, and the water retaining portion is connected with the flow guiding portion.

In some embodiments, the flow guiding portion is configured as a tubular structure that communicates with the mist outlet tube, the water retaining portion is connected to an end portion of the tubular structure, and a passage through which the water mist flow is formed between the water retaining portion and the tubular structure.

In some embodiments, the water retaining portion is configured as an annular plate-like structure.

In some embodiments, the annular plate-like structure is configured as a structure with a taper.

In some embodiments, the mist collecting portion is configured as a curved or bent plate-like structure.

In some embodiments, there are at least two plate-like structures, the mist collecting space is formed between the at least two plate-like structures.

In some embodiments, the mist collecting portion is configured as a cylindrical structure, the flow guiding portion and the water retaining portion are located inside the cylindrical structure, an interior of the cylindrical structure forms the mist collecting space.

In some embodiments, the water retaining structure further includes an installation structure, wherein, the installation structure is connected with the water tank assembly.

In some embodiments, the installation structure is formed on the flow guiding portion; or the installation structure is formed on the mist collecting portion; or the installation structure is formed on the flow guiding portion and the mist collecting portion, and the installation structure is connected with the water tank assembly in a clamping manner.

In some embodiments, the installation structure includes a clamping hook structure formed at an edge of the flow guiding portion or an edge of the mist collecting portion, or an edge of the flow guiding portion and the mist collecting portion, or, the installation structure includes a clamping block structure formed on a sidewall of the mist collecting portion.

In some embodiments, the water retaining structure further includes a guide structure, the guide structure is disposed on the mist collecting portion or the flow guiding portion, or the mist collecting portion and the flow guiding portion; or, the water retaining structure further includes a positioning structure, the positioning structure is arranged on the mist collecting portion or the flow guiding portion, or the mist collecting portion and the flow guiding portion.

In some embodiments, the guide structure includes a plate-like structure formed at the edge of the mist collecting portions; or the guide structure comprises a plate-like structure formed at the edge of the flow guiding portion, or the guide structure comprises a plate-like structure formed at the edge of the mist collecting portion and the flow guiding portion, or, the guide structure is a guide surface formed on the sidewall of the mist collecting portion.

In some embodiments, the positioning structure includes a structure extending outward at the edge of the flow guiding portion or on the sidewall of the mist collecting portion, or at the edge of the flow guiding portion and on the sidewall of the mist collecting portion.

In some embodiments, the water retaining structure is an integrated structure.

In a second aspect, a humidifier is provided, which includes the above water retaining structure.

The water retaining structure and the water tank assembly of some embodiments in the present disclosure are split, so that the bottom surface of the water tank assembly is configured as a flat surface, or a height of the structure disposed on the bottom surface is reduced. Therefore, the water tank assembly is more convenient to assemble and weld, and a welding quality is better. Moreover, the water retaining structure integrates both a mist collecting function and a water retaining function, reduces a number and types of parts, and facilitates an installation.

BRIEF DESCRIPTION OF THE DRAWINGS

The above and other objectives, features and advantages of the disclosure will be clearer through the following description of the embodiments of the disclosure with reference to the drawings. In the drawings.

DETAILED DESCRIPTION OF THE EMBODIMENTS

The following describes the disclosure based on the embodiments, but the disclosure is not limited to these embodiments. Those of ordinary skill in the art should understand that the drawings provided herein are for illustrative purposes, and the drawings are not necessarily drawn to scale.

Unless the context clearly requires, the words "including", "containing" and the like in the entire specification and claims should be interpreted as the meaning of inclusive rather than exclusive or exhaustive meaning, that is, "including but not limited to" meaning.

In the description of the present disclosure, it should be understood that the terms "first", "second", etc. are for descriptive purposes only, and cannot be understood as indicating or implying relative importance. In addition, in the description of the present disclosure, unless otherwise stated, the meaning of "multiple" is two or more.

A water retaining structure provided by the present disclosure is installed on a bottom surface of a water tank assembly, is optionally installed on the bottom surface of the water tank assembly in a buckling connection manner and is configured to deflect water mist to enable the water mist to flow into a mist outlet tube, thereby improving humidifying and atomizing efficiency. Moreover, the water retaining structure also has a water retaining function, so that noise caused by the fact that water in the mist outlet tube directly falls into a water tank is avoided.

Figure 1:
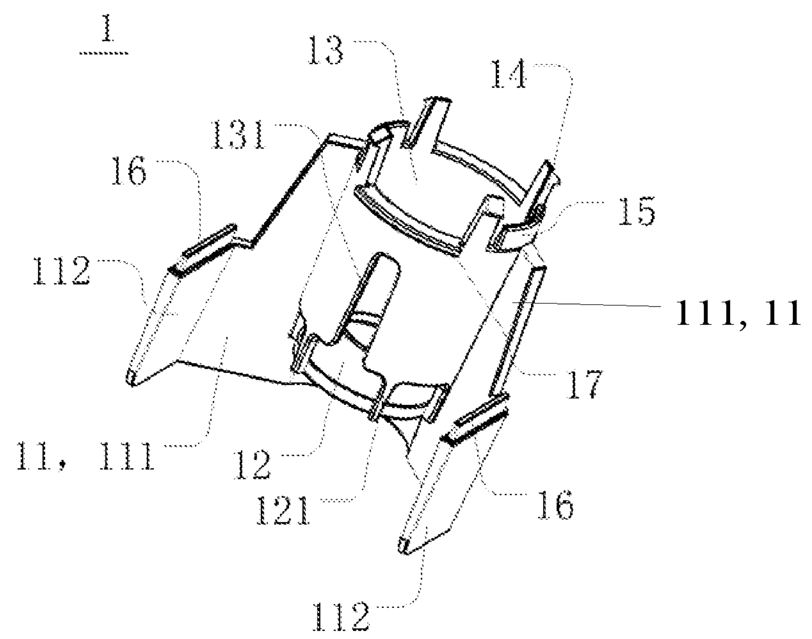
FIG. 1 illustrates a schematic structural diagram of a water retaining structure in a first embodiment.
Figure 2:
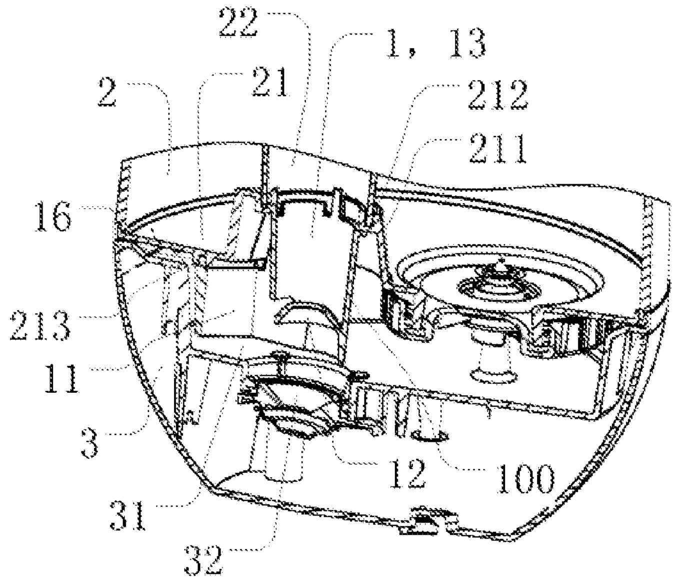
FIG. 2 illustrates a schematic partial cross-section diagram of a water retaining structure installed on a humidifier in a first embodiment.

As shown in FIG. 1 and FIG. 2, in a first embodiment, a water retaining structure 1 provided by the present disclosure is disposed on a water tank assembly of a humidifier. The water tank assembly includes a water tank body 2 and a bottom cover 21 disposed at a bottom of the water tank body 2. A surface of the bottom cover 21 outside the water tank body 2 forms a bottom surface of the water tank assembly. The water retaining structure 1 is disposed on the bottom surface. That is, the water retaining structure 1 is disposed on the bottom cover 21. The water retaining structure 1 includes a mist collecting portion 11 and a water retaining portion 12. The mist collecting portion 11 is configured to shield and deflect water mist to enable the water mist to flow into a mist outlet tube 22. The water retaining portion 12 collects water flowing down in the mist outlet tube 22 and deflect the water.

The mist collecting portion 11 is configured as a plate-like structure. In the present embodiment, the mist collecting part 11 is configured as a curved or bent plate-like structure. In some embodiments, there are two mist collecting portions 11. The two mist collecting portions 11 are configured as plate-like structures bending to a same side. A mist collecting space is formed between the two mist collecting portions 11, or a sidewall of a water tank 31 on a base 3 of the humidifier or other structures matched with the mist collecting portions 11 form a mist collecting space which is closed in a circumferential direction. An atomizer 32 and a fan air outlet on the water tank 31 of the base 3 are located at an inner side of the mist collecting space. The mist collecting space enables the water mist not to diffuse to the outside, and the water mist flows to the mist outlet tube 22 through air blown by the air outlet.

The water retaining structure 1 further includes a flow guiding portion 13, the mist collecting portion 11 and the water retaining portion 12 are both connected to the flow guiding portion 13, and water mist in the mist collecting space can flow into the mist outlet tube 22 through the flow guiding portion 13. In some embodiments, the flow guiding portion 13 is configured as a tubular structure in which a flow passage through which water mist flows is formed, and the flow passage is communicated with the mist outlet tube 22. The water retaining portion 12 is disposed on the flow guiding portion 13 so as to be opposite to the position of the mist outlet tube 22. In some embodiments, the water retaining portion 12 is connected to an end portion of the flow guiding portion 13 through a connection structure 121, and the water retaining portion 12 is spaced apart from the flow guiding portion 13 by a certain distance so as to form a passage through which water mist and air flow circulate. In some embodiments, the water retaining portion 12 is disposed at a lower end of the flow guiding portion 13. The connection structure 121 is configured as an elongated structure so as to reduce its obstruction to the circulation of water mist and air flow, a plurality of connection structures 121 are arranged at intervals in the circumferential direction of the flow guiding portion 13, and water mist also circulates between two adjacent connection structures 121. Or, a gap 131 is formed at a portion of the flow guiding portion 13 adjacent to the water retaining portion 12, the gap 131 is communicated with a clearance between the water retaining portion 12 and the flow guiding portion 13 to increase a circulation area of water mist and air flow into an interior of the flow guiding portion 13.

Water flowing down along an inner wall of the flow guiding portion 13 can fall onto the water retaining portion 12. In some embodiments, the water retaining portion 12 is configured as a circular plate-like structure, or, in order to reduce an obstruction of the water retaining portion 12 to the flow of the water mist, a through hole is provided in the plate-like structure so that the water retaining portion 12 forms an annular structure, and the through hole allows an circulation of the water mist. In some embodiments, the water retaining portion 12 is configured as a cap-like structure, that is, both surfaces of the water retaining portion 12 are tapered surfaces and protrude to one side close to the flow guiding portion 13, so that the water retaining portion 12 has a flow guiding effect on water falling on the water retaining portion 12. In some embodiments, a through hole is formed in the cap-like structure, the through hole allows the circulation of the water mist, and since the water retaining portion 12 is configured as a cap-like structure, the water mist flowing through the through hole is deflected.

The water retaining structure 1 is provided with an installation structure 14. The installation structure 14 is used for connection with the bottom cover 21. In some embodiments, the installation structure 14 is connected with the bottom cover 21 in a clamping manner. In some embodiments, the bottom cover 21 is provided with a docking structure 211 for docking with and communicating with the mist outlet tube 22. The docking structure 211 includes a communication hole communicated with the mist outlet tube 22. An edge of the communication hole is formed with an installation groove 212. An end portion of the mist outlet tube 22 can be inserted into the installation groove 212. In some embodiments, the docking structure 211 is configured as a cylindrical structure formed on the bottom cover 21 in a direction close to an inside of the water tank body 2. The installation groove 212 is formed at an end portion of the cylindrical structure inside the water tank body 2. The installation groove 212 forms an annular groove along the end edge of the cylindrical structure. In some embodiments, the installation structure 14 is configured as a clamping hook structure, a plurality of installation structures 14 are spaced apart from each other, and the clamping hook structure is clamped to an edge of the installation groove 212 to install the water retaining structure 1 to the bottom cover 21. In some embodiments, the installation structure 14 is formed at the end portion of the flow guiding portion 13, a portion of the flow guiding portion 13 and the installation structure 14 are extended into the docking structure 211 when the water retaining structure 1 is installed, and the installation structure 14 is further extended into a radially inner side of the installation groove 212 and is clamped with the edge of the installation groove 212.

As shown in FIG. 1 and FIG. 2, in some embodiments, the water retaining structure 1 is further provided with a guide structure that guides an installation of the water retaining structure 1. The guide structure includes a first guide structure 15. The first guide structure 15 is matched with the docking structure 211 for guidance. In some embodiments, the first guide structure 15 is disposed between two adjacent installation structures 14. The first guide structure 15, for example, is configured as a plate-like structure extending along an edge of the flow guiding portion 13. The first guide structure 15 extends into the installation groove 212 at the same time as the installation structure 14, and the first guide structure 15 comes into contact with an outer wall of the installation groove 212, thereby realizing a guide function. In some embodiments, there are at least two first guide structures 15, and in some embodiments, the at least two first guide structures 15 are oppositely arranged.

The guide structure further includes a second guide structure 16. The second guide structure 16 is disposed on the mist collecting portion 11. In some embodiments, the mist collecting portion 11 includes a first part 111 and a second part 112, after the water retaining structure 1 is installed, the first part 111 of the mist collecting portion 11 is extended into the docking structure 211 and is matched with an inner wall of the docking structure 211, and the second part 112 of the mist collecting portion 11 is located on an outer side of the docking structure 211 and is matched with a surface of the bottom cover 21 located on an outer side of the water tank body 2. The second guide structure 16 is disposed on the second part 112 and is matched with the bottom cover 21. Correspondingly, a guide groove 213 is formed in a surface, located on the outer side of the water tank body 2, of the bottom cover 21. When the water retaining structure 1 is installed, the second guide structure 16 is extended into the guide groove 213 to guide the installation of the water retaining structure 1. Moreover, the second guide structure 16 is matched with the guide groove 213 to further limit the mist collecting portion 11, so that the mist collecting portion is more reliably installed. In some embodiments, a guide structure is also disposed on the first part 111, and a structure matched with the guide structure is disposed on the inner wall of the docking structure 211 to guide the installation of the water retaining structure 1.

In some embodiments, the water retaining structure 1 is further provided with a positioning structure 17. The positioning structure 17 is abutted against the bottom cover 21 or other structures when the water retaining structure 1 is mounted in place, so that the water retaining structure 1 can no longer continue to move. In some embodiments, the positioning structure 17 is arranged at the end portion of the flow guiding portion 13, further between two adjacent installation structures 14, in some embodiments, the positioning structure 17 is configured as a structure extending radially outward along the flow guiding portion 13, the positioning structure 17 cannot extend radially inward of the installation groove 122, and the positioning structure 17 is abutted against the installation groove 212 when the installation structure 14 is clamped to the installation groove 212. In some embodiments of the present disclosure, the positioning structure 17 is also formed on a sidewall of the mist collecting portion 11.

Figure 3:
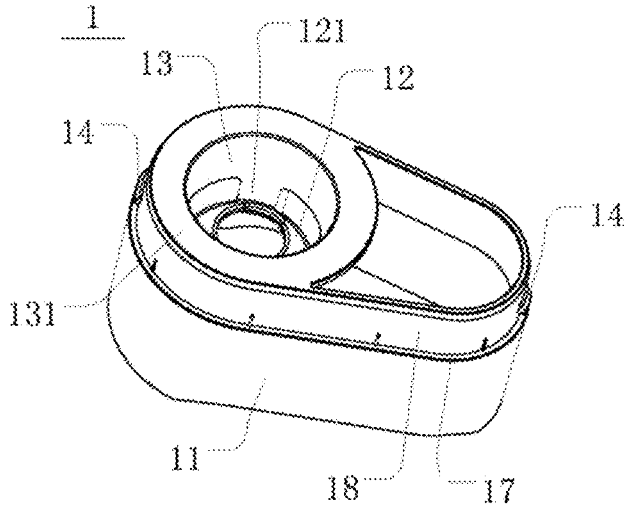
FIG. 3 illustrates a schematic structural diagram of a water retaining structure in a second embodiment.
Figure 4:
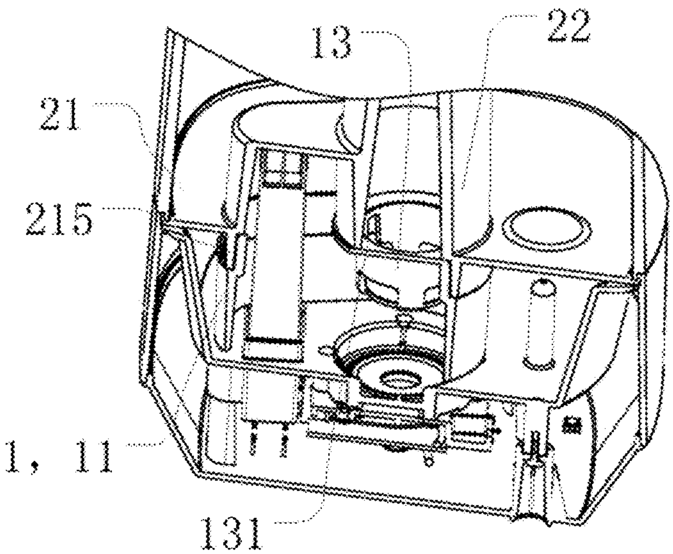
FIG. 4 illustrates a schematic partial cross-section diagram of a water retaining structure installed on a humidifier in a second embodiment.

As shown in FIG. 3 and FIG. 4, in a second embodiment, the mist collecting portion 11 is configured as a cylindrical structure, that is, a closed structure is formed in an circumferential direction, and the flow guiding portion 13 and the water retaining portion 12 are disposed radially inward of the mist collecting portion 11. In some embodiments, the structure of the flow guiding portion 13 and the water retaining portion 12 is the same as in the first embodiment, the water retaining portion 12 is connected to the lower end of the flow guiding portion 13 through the connection structure 121, and an end of the flow guiding portion 13 away from the water retaining portion 12 is connected with the mist collecting portion 11. In some embodiments, the end of the flow guiding portion 13 is provided with an extension portion 131. The extension portion 131 is configured as a radially outwardly extending annular structure formed in a circumferential direction of the flow guiding portion 13, and a portion of the radially outer edge of the extension portion 131 is connected with the mist collecting portion 11. As shown in FIG. 4, in the present embodiment, the mist outlet tube 22 is integrally formed with the bottom cover 21, and the end portion of the mist outlet tube 22 is abutted against the extension portion 131 so that the flow guiding portion 13 is communicated with the mist outlet tube 22.

In some embodiments of the present disclosure, the bottom cover 21 is provided with an installation plate 215. The installation plate 215 is configured as a cylindrical plate-like structure formed on a surface of the bottom cover 21 on the outside of the water tank body 2, or the installation plate 215 is further configured as a cylindrical plate-like structure having a discontinuous portion formed along a circular edge, that is, a cylindrical structure having a discontinuous portion in a circumferential direction. The installation plate 215 is used for connection with the mist collecting portion 11. The mist collecting portion 11 is provided with a guide structure that guides the installation of the water retaining structure 1. In some embodiments, the guide structure is configured as a guide surface 18 formed in a circumferential direction on a sidewall of the mist collecting portion 11 near one end of the collecting portion 11, the guide surface 18 has installation structures 14 formed thereon, the installation structure 14 is configured as a clamping block formed on the guide surface 18, that is, the installation structure 14 is formed on the sidewall of the mist collecting portion 11, and there are a plurality of installation structures 14. When the water retaining structure 1 is installed, the guide surface 18 is contacted with the installation plate 215 and achieves a guide effect, and the installation structure 14 is clamped with a clamping structure (not shown) on the installation plate 215. In some embodiments, a portion of the sidewall of the mist collecting portion 11 connected with the guide surface 18 is provided with a positioning structure 17. The positioning structure 17 is configured as a structure extending outward on the sidewall of the mist collecting portion 11, and the positioning structure 17 is capable of being abutted against the installation plate 215 to position the water retaining structure 1.

Or, in some embodiments, the installation plate 215 is formed on a surface of the bottom cover 21 on the inner side of the water tank body 2, and a hole corresponding to an area structure defined by the installation plate 215 is formed on the bottom cover 21 for installing the water retaining structure 1, so that a surface of the bottom cover 21 on the outer side of the water tank body 2 is form a flat surface to facilitate connection of the bottom cover 21 with the water tank body 2.

Figure 5:
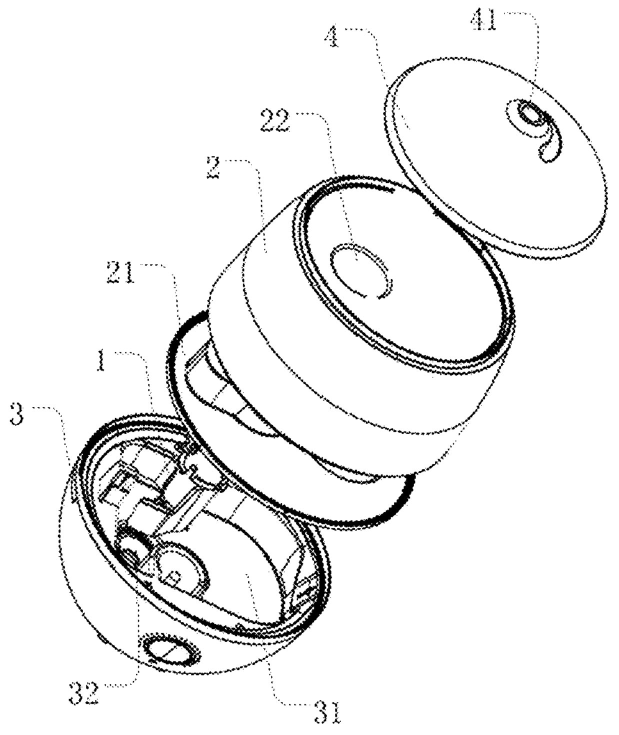
FIG. 5 illustrates a schematic exploded structural diagram of a humidifier.

As shown in FIG. 5, some embodiments of the present disclosure provides a humidifier which includes a water tank assembly, a base 3 and a mist outlet cover 4. The water tank assembly includes a water tank body 2 and a bottom cover 21. The bottom cover 21 and the water tank body 2 are split and fixedly connected together through welding and the like. The water tank assembly is installed on the base 3, a mist outlet tube 22 in the water tank body 2 is communicated with a water tank 31 on the base 3, the mist outlet cover 4 is installed on the water tank body 2, the mist outlet cover 4 is provided with a mist outlet 41, and the mist outlet 41 is communicated with the mist outlet tube 22 to allow a spraying of water mist.

The bottom cover 21 is provided with the water retaining structure 1, the water retaining structure 1 is installed on the bottom cover 21 in a clamping manner and the like, the water retaining structure 1 forms a mist collecting space in the water tank 31, water mist generated by an atomizer 32 on the base 3 enters the mist collecting space, the water mist is prevented from diffusing, and the water mist enters the mist outlet tube 22 through the mist collecting space and is sprayed out through the mist outlet 41. Moreover, the water retaining structure 1 prevents water flowing down in the mist outlet tube 22 from directly dropping into the water tank 31, so that the water dropping sound is eliminated, and a noise of the humidifier is reduced.

In some embodiments of the present disclosure, it is also possible to provide the water retaining portion 12 and the flow guiding portion 13 as an integrated structure, the mist collecting portion 11 is not connected with the water retaining portion 12 and the flow guiding portion 13, and the mist collecting portion 11 and the flow guiding portion 13 are separately connected with the bottom cover 21.

The water retaining structure provided by the present disclosure and the water tank assembly are split, so that the bottom surface of the water tank assembly is configured as a flat surface, or a height of the structure disposed on the bottom surface is reduced. Therefore, the water tank body and the bottom cover are more convenient to weld, and a welding quality is better. Moreover, both a mist collecting function and a water retaining function are integrated, thereby reducing a number and types of parts, and facilitating a installation.

Those skilled in the art easily understand that the above technical solutions can be freely combined and superimposed on the premise of no conflict.

It should be understood that the above implementation manners are only exemplary, and not limiting, without departing from the basic principles of the present disclosure. Those skilled in the art can make various obvious or equivalent modifications or replacements for the above details, which will be included within the scope of the claims of the present disclosure.

What is claimed is:

1. A water retaining structure, disposed on a bottom surface of a tank, wherein, the water retaining structure and the tank are split, the water retaining structure comprises a mist collecting plate and a water retaining plate, the mist collecting plate is formed into a mist collecting space, the mist collecting space is communicated with a mist outlet tube in the tank, and the water retaining plate is configured to collect water flowing down from the mist outlet tube;

wherein the water retaining structure further comprises a flow guiding tube, wherein the flow guiding tube is configured to guide water mist, the water retaining plate is connected with the flow guiding tube, the water retaining plate is disposed at a bottom of the flow guiding tube, and the flow guiding tube is connected with the mist collecting space;

wherein the mist collecting plate is disposed on the flow guiding tube, the mist collecting space is formed by the collecting plate;

wherein the water retaining structure further comprises a clamping hook or a clamping block, wherein the clamping hook or the clamping block is detachably connected with the tank;

wherein the clamping hook or the clamping block is formed on the flow guiding tube; or the clamping hook or the clamping block is formed on the mist collecting plate; or the clamping hook or the clamping block is formed on the flow guiding tube and the mist collecting plate, and the clamping hook or the clamping block is connected with the tank in a clamping manner;

wherein a through hole is disposed in the water retaining plate, the water retaining plate is an annular plate, and the through hole allows a circulation of the water mist.

2. The water retaining structure as claimed in claim 1, wherein the flow guiding tube is communicated with the mist outlet tube, the water retaining plate is connected to an end portion of the tubular structure, and a passage through which the water mist flows is formed between the water retaining plate and the tubular structure.

3. The water retaining structure as claimed in claim 2, wherein the water retaining plate is configured as an annular plate-like structure.

4. The water retaining structure as claimed in claim 3, wherein the annular plate-like structure is configured as a structure with a taper.

5. The water retaining structure as claimed in claim 1, wherein the mist collecting plate is curved or bent.

6. The water retaining structure as claimed in claim 5, wherein there are at least two mist collecting plates, the mist collecting space is formed between the at least two mist collecting plates.

7. The water retaining structure as claimed in claim 1, wherein the mist collecting plate is configured as a cylindrical structure, the flow guiding tube and the water retaining plate are located inside the cylindrical structure, and an interior of the cylindrical structure forms the mist collecting space.

8. The water retaining structure as claimed in claim 1, wherein the clamping hook structure is formed at an edge of the flow guiding tube or an edge of the mist collecting plate, or an edge of the flow guiding tube and the mist collecting plate, or, the clamping block is formed on a sidewall of the mist collecting plate.

9. The water retaining structure as claimed in claim 1, wherein the water retaining structure further comprises a guide plate or a guide surface, the guide plate or the guide surface is disposed on the mist collecting plate or the flow guiding tube, or the mist collecting plate and the flow guiding tube;

wherein the guide plate is formed at the edge of the mist collecting plate; or the guide plate is formed at the edge of the flow guiding tube, or the guide plate is formed at the edge of the mist collecting plate and the flow guiding tube, or, the guide surface is formed on a sidewall of the mist collecting plate.

10. The water retaining structure as claimed in claim 1, wherein the water retaining structure further comprises a positioning protrusion, the positioning protrusion is arranged on the mist collecting plate or the flow guiding tube, or the mist collecting plate and the flow guiding tube;

wherein the positioning protrusion comprises a positioning plate extending outward at the edge of the flow guiding tube or on the sidewall of the mist collecting plate, or at the edge of the flow guiding tube and on the sidewall of the mist collecting plate.

11. The water retaining structure as claimed in claim 1, wherein the mist collecting plate and the water retaining plate are formed into an integrated structure.

12. A humidifier, comprising the water retaining structure as claimed in claim 1.

13. The humidifier as claimed in claim 12, wherein the water retaining structure further comprises a flow guiding tube, wherein, the flow guiding tube is used for guiding water mist, and the water retaining plate is connected with the deflection portion.

14. The humidifier as claimed in claim 13, wherein the flow guiding tube is configured as a tubular structure that is communicated with the mist outlet tube, the water retaining plate is connected to an end portion of the tubular structure, and a passage through which the water mist flows is formed between the water retaining plate and the tubular structure.

15. The humidifier as claimed in claim 14, wherein the water retaining plate is configured as an annular plate-like structure.

16. The humidifier as claimed in claim 15, wherein the annular plate-like structure is configured as a structure with a taper.

* * * * *